(12) United States Patent
Nakazato et al.

(10) Patent No.: US 7,329,083 B2
(45) Date of Patent: Feb. 12, 2008

(54) LOADER AND UNLOADER FOR WORKPIECE

(75) Inventors: Shinichi Nakazato, Kurume (JP); Noriyuki Kawanishi, Fukuoka (JP); Shigetoshi Koga, Dazaifu (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 235 days.

(21) Appl. No.: 10/848,441

(22) Filed: May 18, 2004

(65) Prior Publication Data

US 2004/0240980 A1  Dec. 2, 2004

(30) Foreign Application Priority Data

May 26, 2003 (JP) .............................. 2003-147261

(51) Int. Cl.
- *B65G 57/00* (2006.01)
- *B65G 59/02* (2006.01)
- *B65H 29/32* (2006.01)
- *B65B 21/02* (2006.01)

(52) U.S. Cl. .............................. 414/788.7; 414/793.4; 414/801; 414/793; 414/416.01; 414/797

(58) Field of Classification Search ............. 414/788.7, 414/788.4, 792.7, 792.9, 793, 801, 927, 416.01; 198/347.1

See application file for complete search history.

(56) References Cited

U.S. PATENT DOCUMENTS

| | | | |
|---|---|---|---|
| 4,541,762 A | * | 9/1985 | Tischler et al. ........... 414/788.7 |
| 4,946,340 A | * | 8/1990 | Murphy et al. ........... 414/788.8 |
| 5,645,392 A | * | 7/1997 | Leichty et al. ......... 414/416.01 |
| 5,807,065 A | * | 9/1998 | Kuhl ....................... 414/796.7 |
| 5,882,174 A | * | 3/1999 | Woerner et al. .......... 414/788.7 |
| 6,006,638 A | * | 12/1999 | Eltringham .................... 83/86 |
| 6,086,321 A | * | 7/2000 | Takahashi et al. .......... 414/793 |
| 6,152,678 A | * | 11/2000 | King et al. ............... 414/749.5 |

FOREIGN PATENT DOCUMENTS

JP  01-115526 A  5/1989

* cited by examiner

*Primary Examiner*—Saul Rodriguez
*Assistant Examiner*—Gregory W Adams
(74) *Attorney, Agent, or Firm*—RatnerPrestia (57) ABSTRACT

A loader picks up a workpiece from a container, and delivers it to a workstation downstream. An unloader receives the workpiece from the workstation upstream and puts it into a container. In the loader and the unloader respectively, a first stacker and a second stacker, for holding containers in stacked manner, are placed in parallel along direction Y. A table working as a container moving mechanism moves an extracted container along direction Y. A first container transfer mechanism extracts a container from the containers stacked in the first stacker and delivers it to the container moving mechanism. A second container transfer mechanism receives the container from the moving mechanism, and stacks it in the second stacker. A transfer-head working as a workpiece transfer mechanism picks up the workpiece from the container on the table, moves it along direction X, and delivers it to the workstation downstream.

18 Claims, 11 Drawing Sheets

LOADER AND UNLOADER FOR WORKPIECE

FIELD OF THE INVENTION

The present invention relates to a loader for picking up a workpiece from a container, in which workpieces are regularly arranged in one plane, and feeding the workpiece to a workstation, and an unloader for putting the workpiece delivered from the workstation into a container.

BACKGROUND OF THE INVENTION

In general, planar workpieces, such as display panels used in small size display devices, are regularly arranged, e.g. forming a lattice, in one plane and held in a tabular tray for storage or transportation. Those workpieces are picked up one by one sequentially by a transfer mechanism such as a robot from the tray stacked in a loader and supplied to a workstation where components are mounted onto each one of the workpieces. Such a transfer mechanism is disclosed in, e.g. Japanese Patent Application Non-Examined Publication No. H1-115526. Each one of the workpieces undergone the process at the workstation is then held sequentially into an empty tray held by an unloader.

In the foregoing loader and unloader, two tray holders, holding trays in stacked manner, are often placed in parallel. The loader picks up a workpiece from a tray taken out from a first tray holder, and the unloader puts the workpiece in a tray. Those trays are transferred by a tray transfer section, and stacked in a second tray holder.

However, according to the foregoing structure, the workpieces arranged in a two dimensional way should be picked up from the tray, so that the workpiece transfer mechanism needs a mechanism to deal with a pick-up from the two dimensional position. A conventional loader and unloader must incorporate the tray transfer section in addition to the workpiece transfer section. Those necessary elements make it difficult to downsize the loader and the unloader.

SUMMARY OF THE INVENTION

The workpiece loader of the present invention picks up a workpiece from a container and supplies it to a workstation downstream of the loader. The loader has a first stacker, a second stacker, a container moving mechanism, a first container-transfer mechanism, a second container-transfer mechanism and a workpiece transfer mechanism. The first stacker holds containers in stacked condition, each one of the containers contains workpieces regularly arranged in one plane. The second stacker is placed parallel with the first one in a first direction, and holds empty containers in stacked condition. The container moving mechanism moves above the first and the second stackers, thereby moving the container between the first stacker and the second stacker. The first container-transfer mechanism takes out a container stacked in the first stacker one by one and transfers the one to the container moving mechanism. The second container transfer mechanism receives the container from the container moving mechanism one by one and stacks them in the second stacker. The workpiece transfer mechanism picks up the workpieces one by one from the container held by the container moving mechanism, and moves a workpiece in a second direction orthogonal to the first direction and delivers it to the workstation downstream of the workpiece transfer mechanism.

The workpiece unloader of the present invention puts workpieces transferred from a workstation upstream one by one into a container in a regular arrangement in one plane. The unloader has a first stacker and a second stacker, a container moving mechanism, a first container transfer-mechanism, a second container transfer-mechanism, and a workpiece transfer mechanism. The first stacker holds empty containers, where no workpieces are held, in stacked manner, and the second stacker is placed parallel with the first one in the first direction and holds containers in the stacked manner, and each one of the containers holds the workpieces. The container moving mechanism moves above the first and the second stackers, thereby moving each one of the containers between the first stacker and the second stacker. The first container-transfer mechanism takes out the containers stacked in the first stacker one by one and transfers the one to the container moving mechanism. The second container transfer mechanism receives the containers from the container moving mechanism one by one and stacks them in the second stacker. The workpiece transfer mechanism receives the workpieces one by one from the workstation upstream, and moves the one in a second direction orthogonal to the first direction and transfers them to the container held by the container moving mechanism.

BRIEF DESCRIPTION OF THE DRAWINGS

FIG. 7A-FIG. 8B illustrate an operation of the loader used in the display-panel assembly apparatus in accordance with the exemplary embodiment of the present invention.

FIG. 9A-FIG. 10B illustrate an operation of the unloader used in the display-panel assembly apparatus in accordance with the exemplary embodiment of the present invention.

DETAILED DESCRIPTION OF PREFERRED EMBODIMENT OF THE INVENTION

Figure 1:
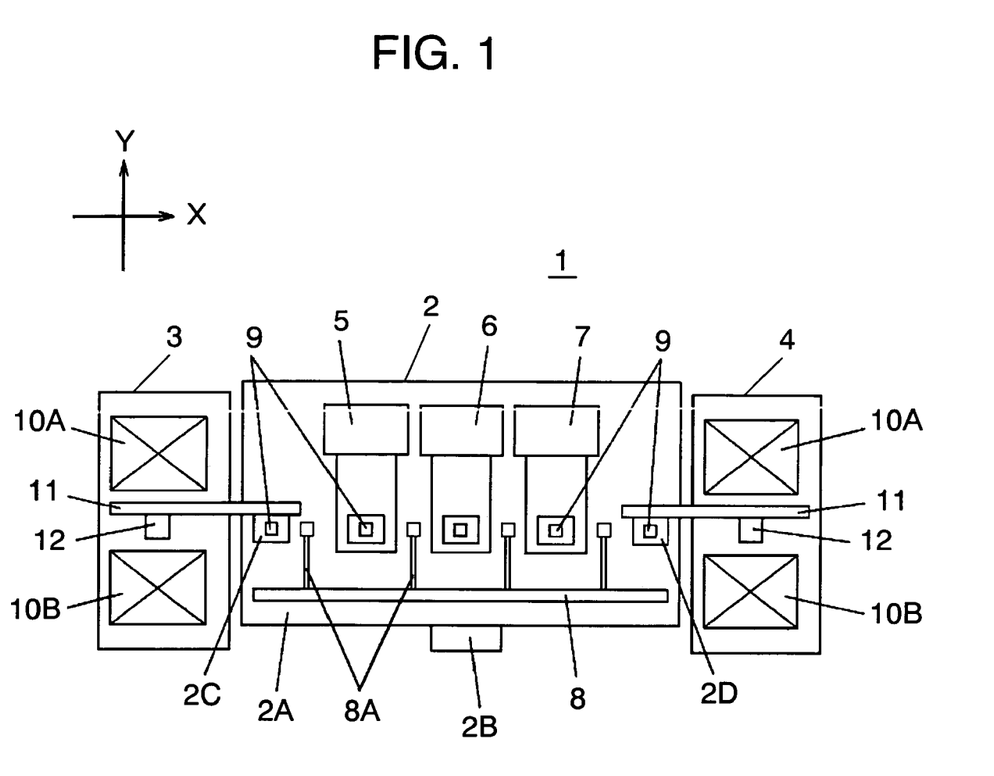
FIG. 1 shows a plan view of a display-panel assembly apparatus which includes a loader and an unloader in accordance with an exemplary embodiment of the present invention.
Figure 2:
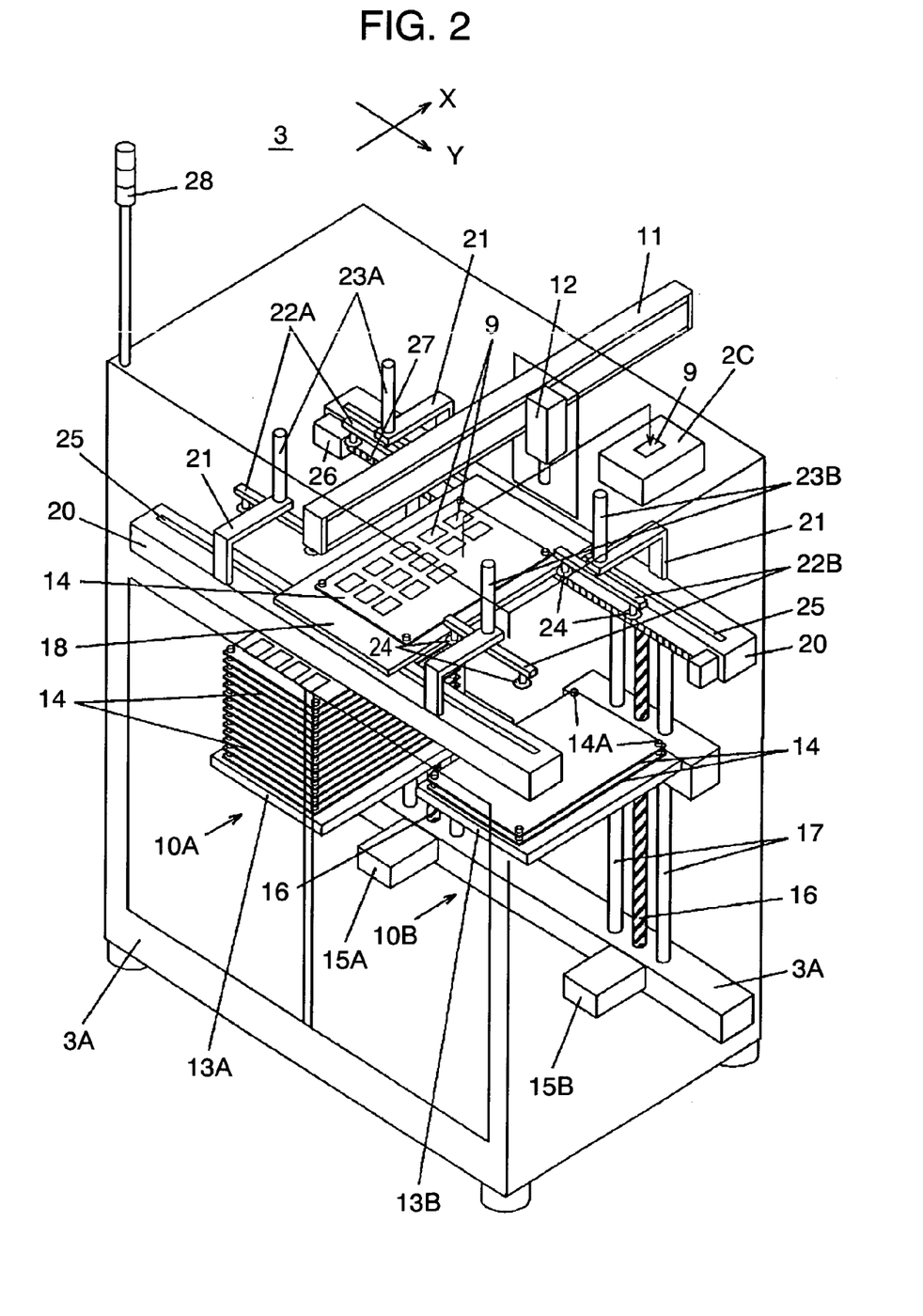
FIG. 2 shows a perspective view of a loader (unloader) in accordance with the exemplary embodiment of the present invention.

FIG. 1 shows a plan view of a display-panel assembly in accordance with an exemplary embodiment of the present invention. FIG. 2 shows a perspective view of a loader and an unloader in accordance with the exemplary embodiment of the present invention.

Display-panel assembly apparatus 1 is coupled with loader 3 upstream of workstation 2, and coupled with unloader 4 downstream of workstation 2. At workstation 2, electronic components are mounted onto a display substrate, such as a liquid crystal display (LCD) substrate, thereby fabricating a display-panel. At workstation 2, adhesive tape attaching section 5, electronic component mounting section 6, and electronic component press-bonding section 7 are placed in series on table 2A.

Carrying mechanism 8 has carrying arm 8A which carries substrate 9 supplied from loader 3 to attaching section 5, mounting section 6, and press-bonding section 7 subsequently to the downstream. Attaching section 5 attaches adhesive tape such as anisotropic conductive film (ACF) on substrate 9 for bonding electronic components. Mounting section 6 mounts electronic components on substrate 9 to which the adhesive tape has been attached. Press-bonding section 7 press-bonds the electronic components mounted on substrate 9 by heat and load.

Figure 4A:
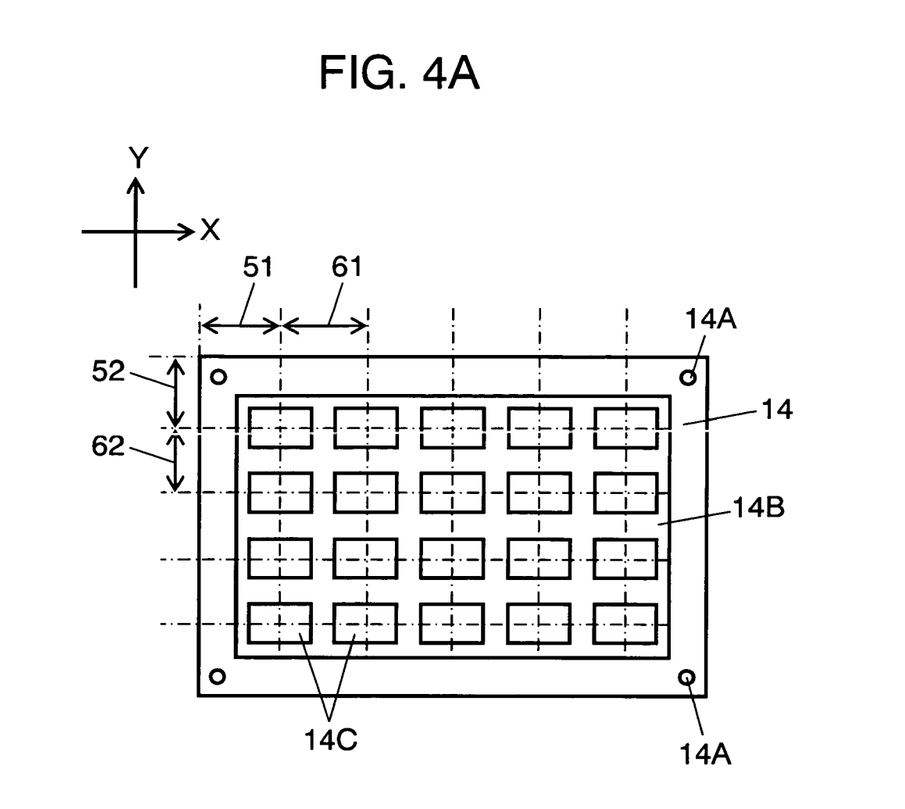
FIG. 4A shows a top view of a palette, which holds workpieces as a container, used in the display-panel assembly apparatus in accordance with the exemplary embodiment of the present invention.

Next, loader 3 and unloader 4 are described hereinafter. Loader 3 supplies substrate 9, on which electronic components are to be mounted, as a workpiece to workstation 2. Substrates 9 are held in tray 14B mounted in planar palette 14 as shown in FIG. 4A, and are arranged such that they form a lattice. Loader 3 picks up substrate 9 one by one from palette 14 held in stacked condition, and supplies it to workstation 2. In other words, loader 3 works as a workpiece supplying device that picks up a workpiece, i.e. substrate 9, from palette 14 working as a container which holds the workpieces arranged regularly in one plane, and supplies the workpiece to workstation 2 downstream of loader 3.

Substrate 9 is supplied from loader 3 to workstation 2 in the following manner: transfer-head moving mechanism (hereinafter referred to simply as a moving mechanism) 11 includes transfer head 12. Head 12 picks up substrate 9 from palette 14 held in first stacker 10A. Head 12 transfers substrate 9 onto substrate receiver 2C prepared at workstation 2. Then vacated palette 14 is stacked and held in second stacker 10B.

Unloader 4 has a structure similar to that of loader 3, and includes stackers 10A, 10B, moving mechanism 11, and head 12. Those elements are placed in unloader 4 symmetrically to those in loader 3 with respect to workstation 2. Unloader 4 receives substrate 9 after substrate 9 has been processed by workstation 2. This occurs when head 12 transfers substrate 9 from substrate delivery position 2D. Substrate 9 is placed into palette 14.

Empty palettes are held in stacker 10A of unloader 4, and palettes 14 including trays 14B, shown in FIG. 4A, filled with substrates 9 are stacked and held in stacker 10B. In other words, unloader 4 works as a workpiece holding device that puts substrates 9, delivered from workstation 2 upstream of unloader 4, into palette 14 in a regular arrangement in one plane.

Next, a structure of loader 3 is described with reference to FIG. 2. As previously discussed, since loader 3 has a structure symmetrical to that of unloader 4, only the structure of loader 3 is described and the description of a structure of unloader 4 is omitted here.

Stackers 10A and 10B are placed at the bottom of box-shaped frame 3A. Both of a palette-feeding table transfer mechanism for transferring palette 14 and moving mechanism 11 for picking up substrate 9 from palette 14 and moving the substrate 9 are placed above stackers 10A and 10B. The palette-feeding table mechanism includes guide 25, palette-feeding table driver (hereinafter referred to simply as a driver) 26, and feed screw (hereinafter referred to as a screw) 27. Those elements will be detailed later.

Stackers 10A, 10B are placed parallel in direction Y (a first direction), and each of the stackers has first lift table (hereinafter referred to as a table) 13A and second lift table (table) 13B, respectively. Palettes 14 are stacked on tables 13A and 13B. Palette 14 is formed of a rectangular plate member, and has registration parts 14A at each corner. When palettes 14 are stacked one by one, registration parts 14A of each palette are engaged with each other for positioning the palettes firmly.

Tables 13A, 13B are guided by guide 17 and raised or lowered by feed screw 16. Each of two screws 16 is respectively driven by first lift driver (driver) 15A and second lift driver (driver) 15B. A first lift mechanism that raises or lowers table 13A is formed of driver 15A, screw 16, guide 17, and a second lift mechanism that raises or lowers table 13B is formed of driver 15B, screw 16, guide 17.

In the foregoing structure, stacker 10A holds palettes 14 in stacked condition, each one of the palettes holding substrates 9. Stacker 10B is placed parallel with stacker 10A along direction Y, and holds empty palettes 14 in stacked condition. Stackers 10A and 10B have respectively tables 13A and 13B, and the first and second lift mechanisms that lift those tables.

Above stackers 10A and 10B, two Y-tables 20 are placed horizontally along direction Y, and guide 25 is prepared on the top surface of each one of tables 20 in the longitudinal direction (direction Y). Palette-feeding table (table) 18, on which palette 14 is placed, is mounted slidably to guide 25. Table 18 is driven to reciprocate along direction Y by driver 26 and screw 27.

In the foregoing structure, the palette-feeding table transfer mechanism is formed of guide 25, driver 26, and screw 27. Table 18 and the palette-feeding table transfer mechanism move above stackers 10A and 10B along direction Y for moving palette 14 between stacker 10A and stacker 10B. A container moving mechanism is formed of table 18 and the palette-feeding table transfer mechanism.

Each of two Y-tables 20 is equipped with reverse-L-shaped bracket 21 corresponding to the position of stackers 10A and 10B. Brackets 21 have respectively first palette pick-up head (head) 22A and second palette pick-up head (head) 22B responsive to stackers 10A and 10B. Heads 22A, 22B respectively include two suction pads 24, and each of them is respectively raised or lowered by first actuator 23A and second actuator 23B.

Head 22A sucks and takes out palette 14 stacked in stacker 10A with suction pad 24 and transfers it onto table 18. Head 22B sucks and holds palette 14 placed on table 18 with suction pad 24, and puts it in stacker 10B for stacking. Head 22A and actuator 23A thus form a first container-transfer mechanism that takes out palette 14 stacked in stacker 10A and delivers it to table 18. Head 22B and actuator 23B form a second container-transfer mechanism that receives palette 14 from table 18 and stacks it in stacker 10B.

Moving mechanism 11 is disposed at an intermediate position between head 22A and head 22B along direction X, and extends from loader 3 to an area above substrate receiver 2C of workstation 2. Moving mechanism 11 moves head 12 along direction X and picks up substrate 9 from palette 14 placed on table 18 and transfers it to substrate receiver 2C.

Moving mechanism 11 and head 12 pick up substrate 9 from palette 14 held by table 18 and move substrate 9 along direction X (second direction) orthogonal to direction Y to deliver it to a device downstream. In other words, moving mechanism 11 and head 12 form a workpiece transfer mechanism, which is disposed at the intermediate position between stacker 10A and stacker 10B in the foregoing structure.

During the transfer operation of palette 14 by heads 22A and 22B, head 22A picks up topmost palette 14 in a stack of palettes 14, and raises it up to a first stand-by position at a given height above stacker 10A. Head 22B picks up palette 14 placed on table 18, and raised it up to a second stand-by position at a given height above stacker 10B. In other words, the first container transfer mechanism is disposed above stacker 10A, and picks up topmost palette 14 in stacker 10A up to the first stand-by position by up and down operation. The second container transfer mechanism is disposed above stacker 10B, and picks up palette 14 on table 18 up to the second stand-by position by up and down operation.

Table 18 moves between a first delivery position and a second delivery position. The first delivery position is placed between stacker 10A and the first stand-by position, and the second delivery position is placed between stacker 10B and the second stand-by position. At the first delivery position, palette 14 held by head 22A is placed onto table 18, and at the second delivery position, palette 14 on table 18 is taken out therefrom by head 22B. The foregoing structure allows the palette-feeding table mechanism to move palette 14 received from head 22A to the second delivery position. As previously described, the palette-feeding table mechanism is formed of guide 25, driver 26, and screw 27.

Figure 3:
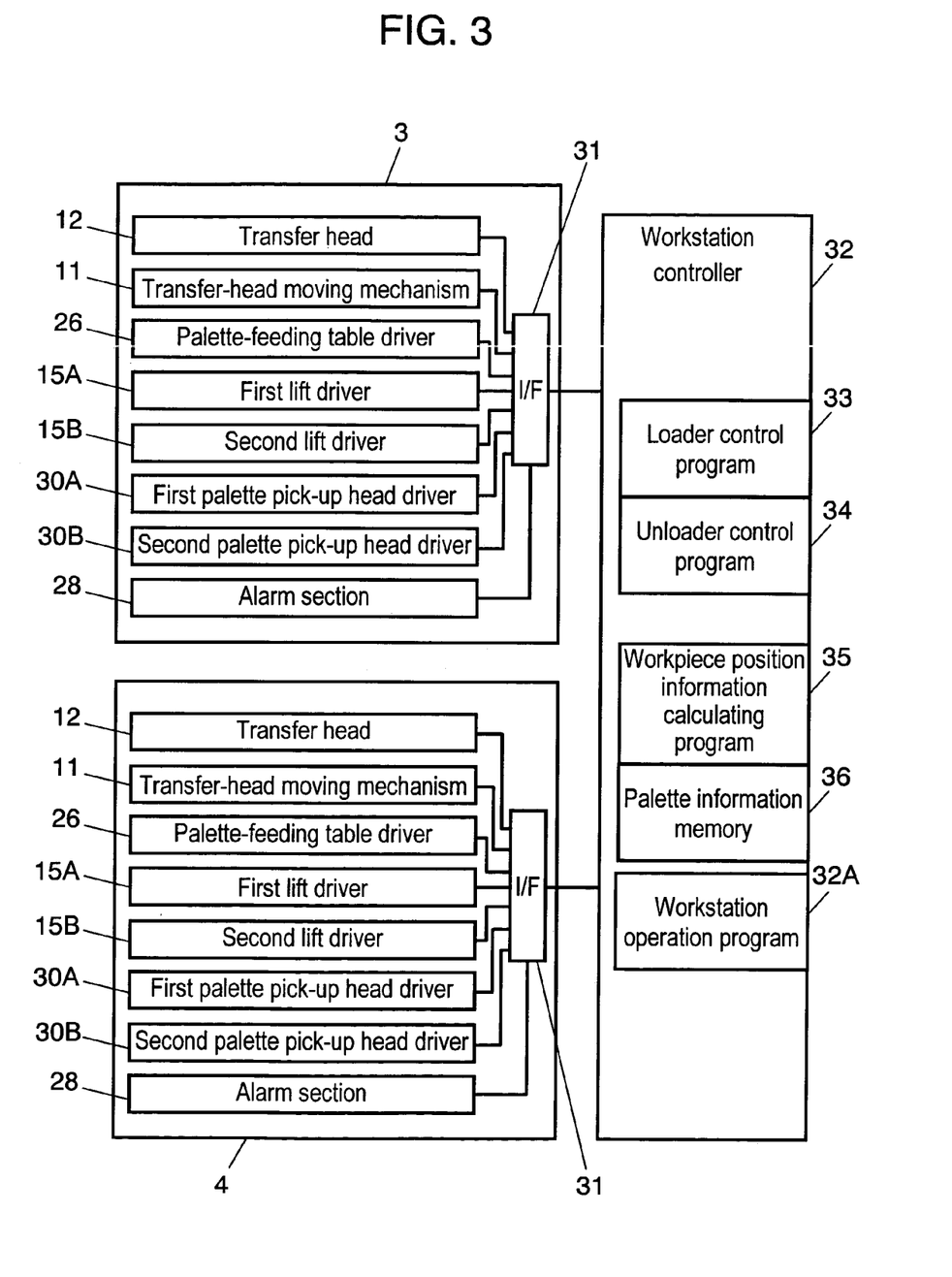
FIG. 3 shows a block diagram illustrating a control system of the loader and the unloader in the display-panel assembly apparatus in accordance with the exemplary embodiment of the present invention.

Next, a control system of the loader and the unloader of the display-panel assembly apparatus in accordance with this exemplary embodiment of the present invention is demonstrated hereinafter with reference to FIG. 3 which shows a block diagram of the control system. As previously discussed, loader 3 and unloader 4 have common mechanisms and elements to be controlled, so that the common elements bear the same reference symbols. The elements of loader 3 and unloader 4 are coupled to workstation controller 32 via input-output interface 31. The elements include head 12, moving mechanism 11, driver 26, drivers 15A, 15B, first palette pick-up head driver 30A, second palette pick-up head driver 30B, alarm lamp (alarm section) 28.

Controller 32 controls an operation of workstation 2. To be more specific, controller 32 controls attaching section 5, mounting section 6, press-bonding section 7, and carrying mechanism 8 according to workstation operation program 32A. Controller 32 has a program storing function and a data storing function, so that it stores a variety of programs such as loader control program 33, unloader control program 34, and workpiece positional information calculating program 35. Palette information memory 36 stores a variety of data such as palette information. Programs 33, 34 are control programs for controlling the operations of loader 3 and unloader 4 respectively. Program 35 calculates a position of substrate 9 on palette 14. The calculated positional information of a workpiece is stored in memory 36 as palette information.

In the foregoing structure, controller 32 controls the following respective elements of loader 3 and unloader 4 according to programs 33, 34: table 18, heads 22A, 22B, head 12, and moving mechanism 11. Controller 32 controls the palette-feeding table transfer mechanism in loader 3 and unloader 4, thereby positioning substrate 9 held in palette 4 with respect to direction Y.

Figure 4B:
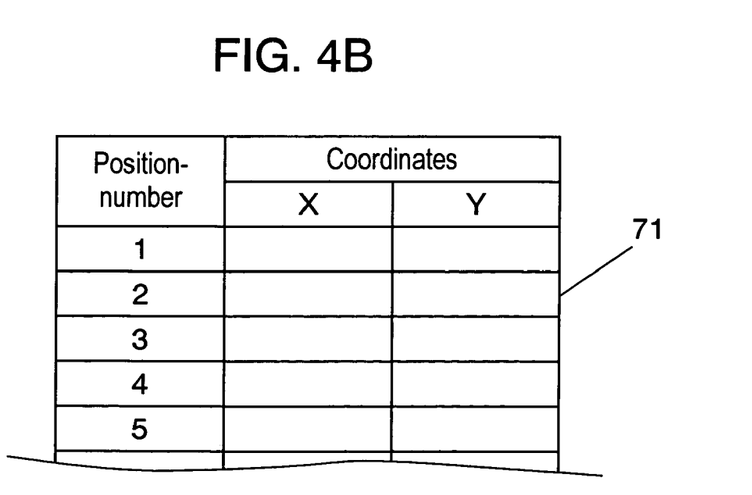
FIG. 4B shows a table listing numbers which are data of the palette shown in FIG. 4A.

Next, palette 14 and palette information are detailed with reference to FIGS. 4A and 4B illustrating the palette information of the display-panel assembly apparatus in accordance with the exemplary embodiment of the present invention. Palette 14 is made of resin-made tray 14B bonded onto a sheet of board. Tray 14B has a number of recesses 14C, in which substrates 9 are held respectively, forming a lattice regularly in one plane. At each corner of palette 14, registration parts 14A are prepared for stacking plural palettes 14 with substrates 9 held in recesses 14C free from misregistration.

The positions of each one of recesses 14C in palette 14 are expressed with coordinates 51, 52 of the corner, and with arrangement pitches 61, 62 of recesses 14C arranged to form a lattice. The corner coordinates 51, 52 express a position of recess 14C at a corner.

FIG. 4B shows a table listing coordinates values expressing positions of each recess 14C corresponding to position numbers specifying each recess 14C. Table 71 shows positional information of workpieces, namely, the positions of substrates 9. This information is used when substrates 9 are picked up from palette 14, or substrates 9 are transferred onto palette 14. To be more specific, designation of a position number in table 71 shown FIG. 4B has moving mechanism 11 and head 12 transfer substrate 9 in designated recess 14C.

This positional information of workpieces is calculated by executing program 35, and stored in memory 36. When the loader or the unloader works, the position number designated of recess 14C is updated one by one on the number counter of memory 36 in response to each one of sequential transfers.

Figure 5:
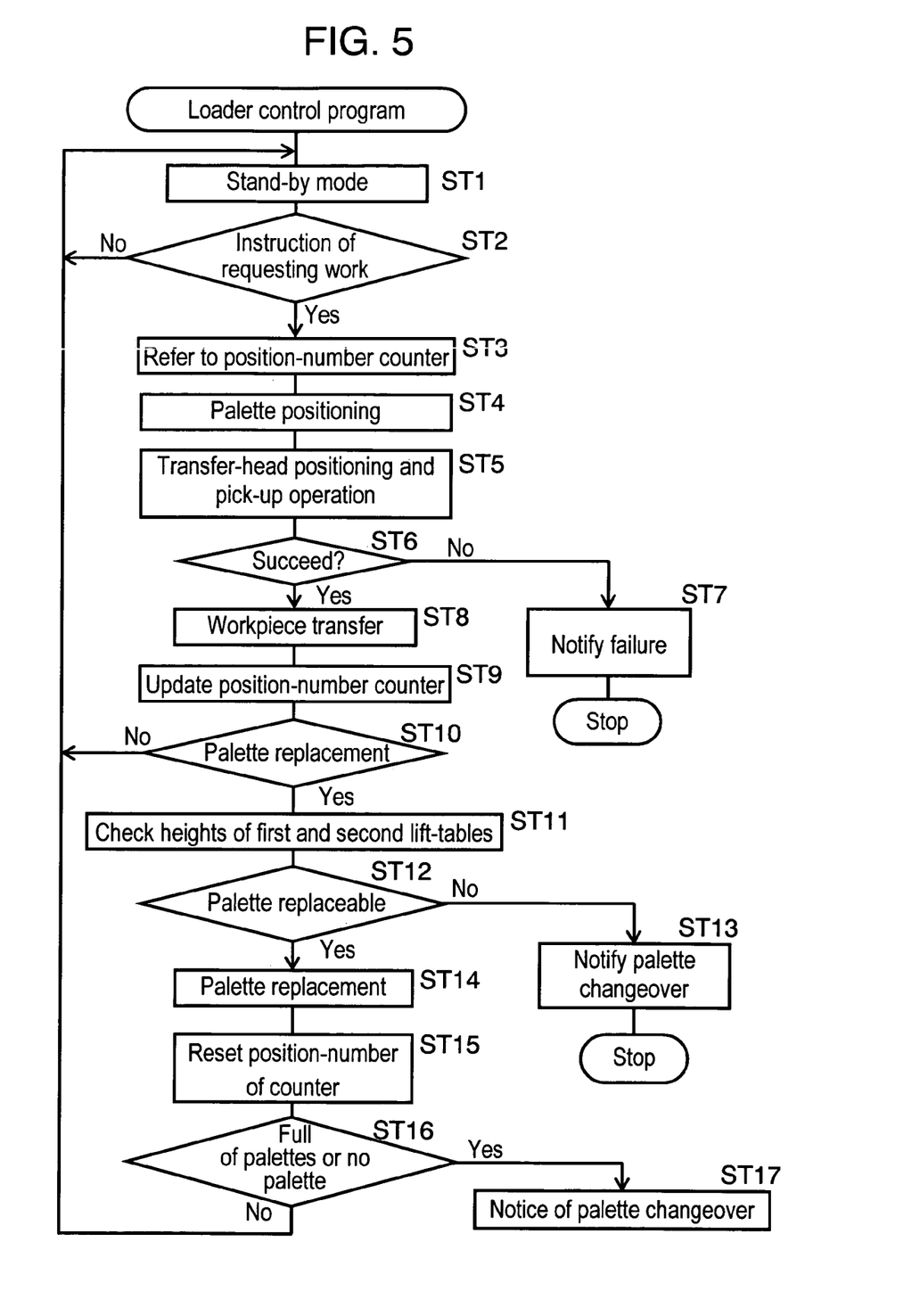
FIG. 5 shows a flowchart illustrating a loader control program used in the display-panel assembly apparatus in accordance with the exemplary embodiment of the present invention.

Operations of loader 3 and unloader 4 discussed above are demonstrated hereinafter. First of all, an operation of loader 3 according to loader control program 33 is demonstrated with reference to FIGS. 5 and 7A-8B. FIG. 5 shows a flowchart of the loader control program for the display-panel assembly apparatus in accordance with this embodiment. FIG. 7A-FIG. 8B illustrate the operation of the loader in the display-panel assembly apparatus.

Figure 7A:
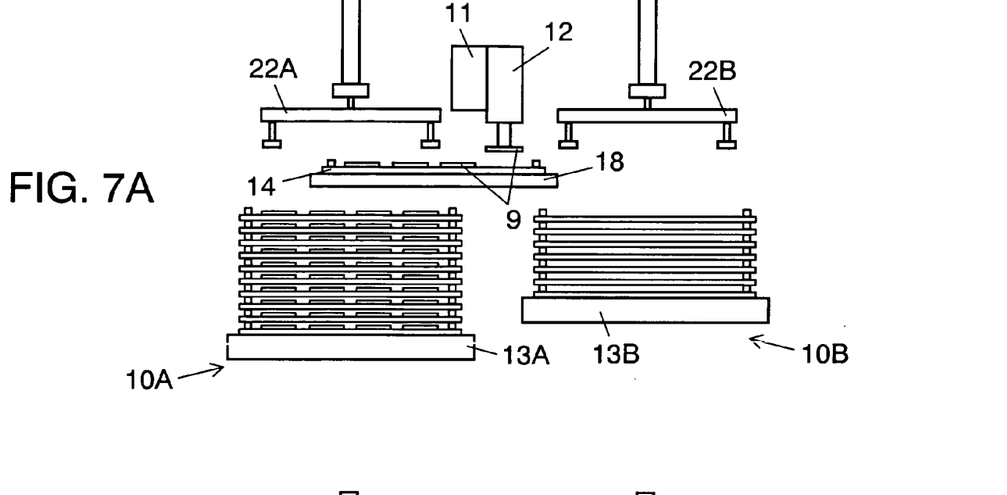

In FIG. 5, program 33 is in stand-by mode and waits an instruction from workstation operation program 32A now executed by controller 32 (ST1). Program 33 monitors whether or not program 32A issues an instruction of requesting work (ST2). If the instruction is issued, program 33 refers to a position-number counter in memory 36 (ST3). According to the position number referred to, program 33 executes positioning a palette (ST4), then positioning head 12. Head 12 picks up substrate 9 placed corresponding to the position number (ST5). FIG. 7A illustrates the positioning operation and the pick-up operation. Table 18 moves along direction Y, and head 12 moves along direction X, so that head 12 is positioned relatively with respect to recess 14C. In FIGS. 7A-8B and 9A-10B, direction Y indicates right-left direction, and direction X indicates front-back direction of the paper.

Program 33 determines whether or not the pick-up operation by head 12 succeeds (ST6). If the operation fails, program 33 reports the pick-up failure (ST7), and stops the apparatus. If the operation succeeds, moving mechanism 11 moves head 12 (which is holding substrate 9) to workstation 2, then places substrate 9 onto substrate receiver 2C (ST8), then program 33 updates the position-number counter (ST9).

Program 33 then determines whether or not the palette should be replaced (ST10). If any substrate 9 still remains in palette 14, the palette is not replaced, and the process is returned to ST1. If all substrates 9 have been taken out, and the palette should be replaced, program 33 checks heights of tables 13A, 13B (ST11), and determines whether or not stackers 10A, 10B are ready for palette replacement (ST12). To be more specific, it is determined whether or not palette 14 (which is holding substrates 9) is available in stacker 10A based on the height of table 13A or the information obtained from optical sensors. It is also determined whether or not stacker 10B has room for holding another empty palette 14 based on the height of table 13B.

Figure 7B:
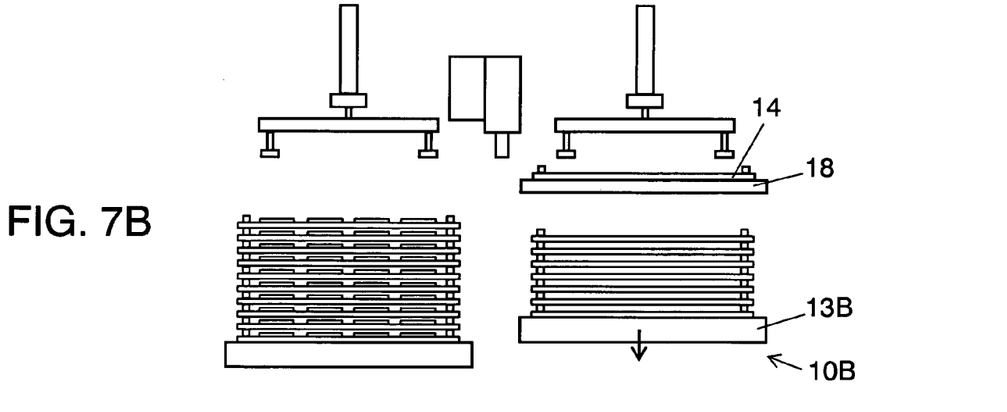
Figure 7C:
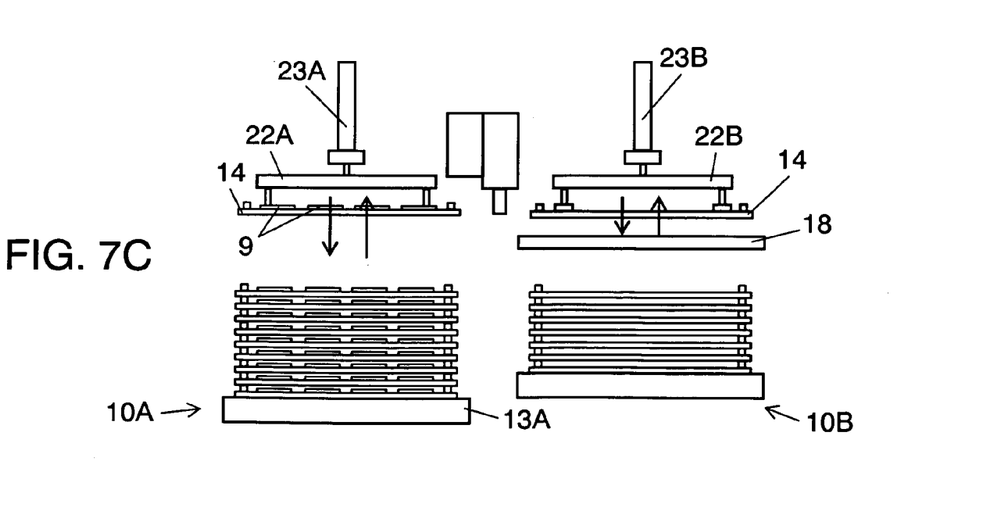

If palette 14A is not available in stacker 10A, or stacker 10B has no room for stacking another palette 14A, it is determined that the palette replacement is impossible. Then program 33 notifies that changeover of the palettes is needed (ST13), and stops the apparatus. When the palette can be replaced, the palette replacement is executed (ST14). To be more specific, as shown in FIG. 7B, table 18 having empty palette 14 is moved to stacker 10B, then as shown in FIG. 7C, this palette 14 is picked up and raised by head 22B, and retained at the second stand-by position. In parallel with this operation, at stacker 10A, palette 14 placed on table 13A is picked up and raised by head 22A, and is retained at the first stand-by position.

Figure 8A:
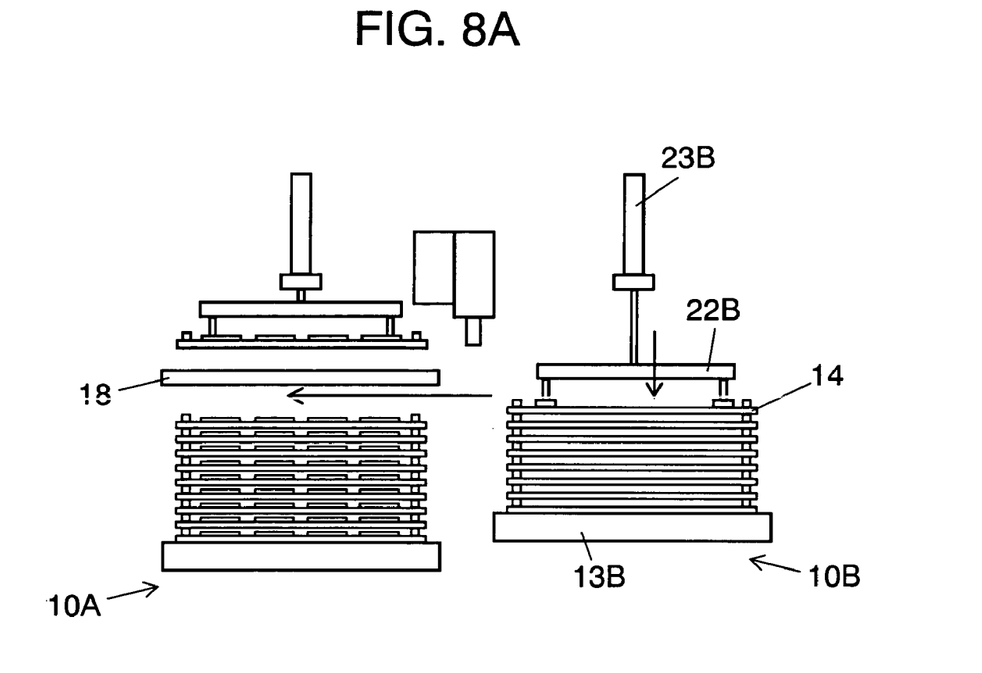
Figure 8B:
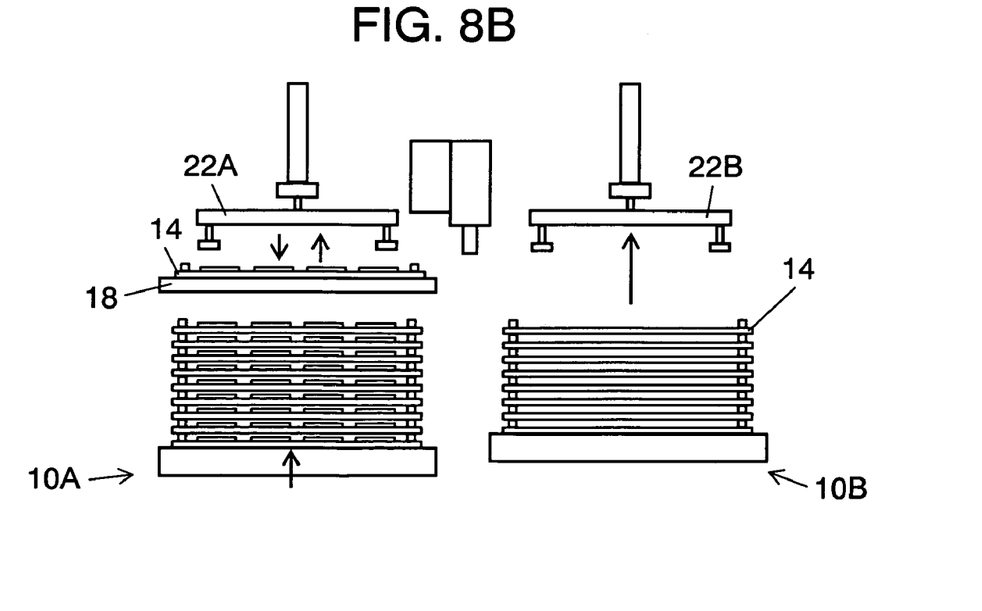

Then as shown in FIG. 8A, empty table 18 is moved back to stacker 10A. Next, actuator 23B is driven to lower head 22B, so that palette 14 retained is placed on table 13B. Then as shown in FIG. 8B, head 22A transfers palette 14 onto table 18 moved to stacker 10A, and head 22B is raised. The palette replacement is thus completed.

Program 33 then resets the position-number counter (ST15), and determines whether or not stackers 10A, 10B are filled with palettes 14 or empty (ST16). This determination about full/empty can be done based on the heights of tables 13A, 13B as done in ST11, or the availability of palettes 14 can be directly detected with an optical sensor. If the stackers are full or empty, necessity of the palette changeover is notified (ST17). If palettes are available but not full in the stackers, the process is returned to ST1 and the steps thereafter are repeated.

Figure 6:
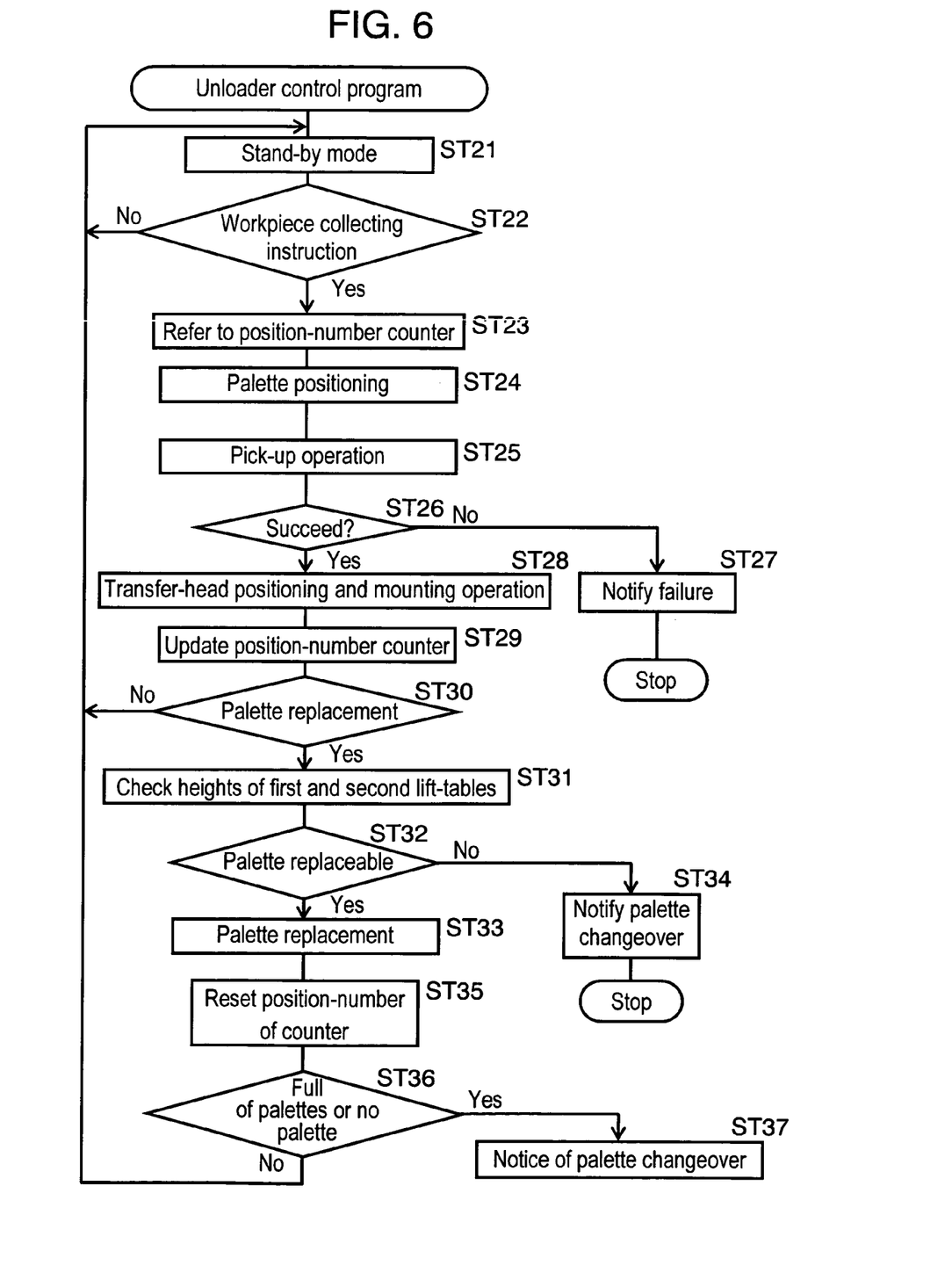
FIG. 6 shows a flowchart illustrating an unloader control program used in the display-panel assembly apparatus in accordance with the exemplary embodiment of the present invention.

Next, unloading operation by unloader 4 is demonstrated hereinafter with reference to FIGS. 6 and 9A-10B. FIG. 6 shows a flowchart of an unloader control program to be executed in the display-panel assembly apparatus in accordance with this embodiment. FIG. 9A-FIG. 10B show the unloading operation in the display-panel assembly apparatus in accordance with the embodiment. In the unloading operation, substrate 9 (that has undergone the mounting process at workstation 2) is put onto palette 14. In other words, substrate 9 is placed on palette 14, which is then moved between stacker 10A and stacker 10B through the reverse procedure to the loading operation discussed above.

Unloader 4 in fact has the same mechanical structure as loader 3; however, its elements work differently from those of loader 3. The statuses of palettes 14 at stackers 10A, 10B are different from those of loader 3. In the case of unloader 4, stacker 10A holds empty palettes 14 stacked, and stacker 10B holds palettes 14, which holds substrates 9, in stacked condition.

After undergoing the mounting process at workstation 2, head 12 and moving mechanism 11, both working as the workpiece transfer mechanism, move substrate 9 upstream. Substrate 9 is then moved along direction X and is placed onto palette 14 held by table 18. Controller 32 of workstation 2 upstream controls the following elements of unloader 4: table 18, heads 22A and 22B, head 12, and moving mechanism 11.

In FIG. 6, program 34 is in stand-by mode and waits for an instruction from workstation operation program 32A now executed by controller 32 (ST21). Program 34 monitors whether or not program 32A issues an instruction of requesting work (ST22). If the instruction is issued, program 34 refers to a position-number counter in memory 36 (ST23).

According to the position number referred to, program 34 executes positioning a palette (ST24). Then, head 12 picks up substrate 9 located at substrate delivery position 2D of workstation 2 (ST25). Program 34 determines whether or not the pick-up operation by head 12 succeeds (ST26). If the operation fails, program 34 reports the pick-up failure (ST27), and stops the apparatus. If the operation succeeds, head 12 holding substrate 9 is moved to unloader 4, then head 12 is positioned and mounting operation is executed (ST28).

Figure 9A:
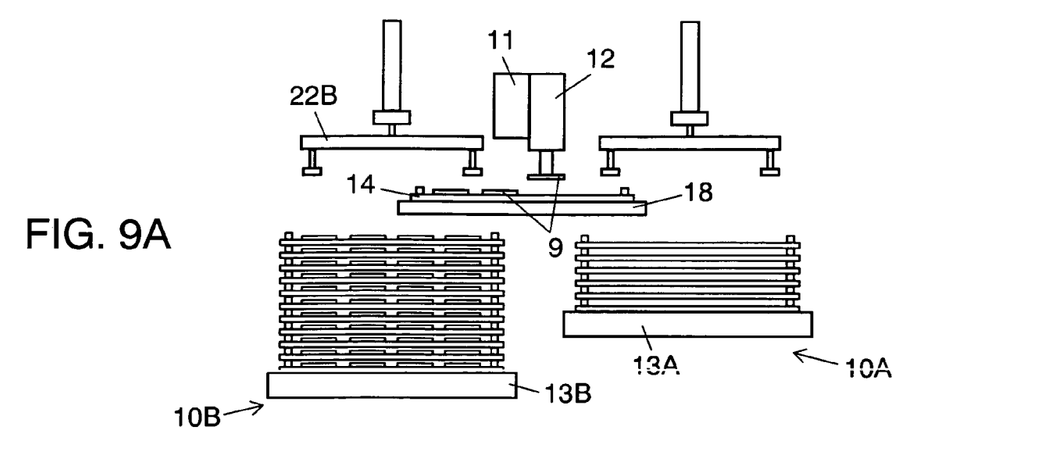

FIG. 9A illustrates the positioning operation and the mounting operation. Table 18 moves along direction Y, and head 12 moves along direction X, so that head 12 is positioned relatively with respect to recess 14C. Program 34 has head 12 mount substrate 9 held by head 12 at a given position on palette 14, then updates the position number counter (ST29).

Program 34 then determines whether or not the palette should be replaced (ST30) as program 33 did for loader 3. If palette 14 is not filled up yet with substrates 9, palette 14 is not replaced, and the process is returned to ST21. If palette 14 is filled up with substrates 9 and the palette should be replaced, program 34 checks heights of tables 13A, 13B (ST31), and determines whether or not the palette replacement is ready (ST32). To be more specific, it is determined whether or not empty palette 14 is available in stacker 10A and whether or not stacker 10B has room for holding another palette 14 filled with substrates 9 based on the heights of table 13A and table 13B.

Figure 9B:
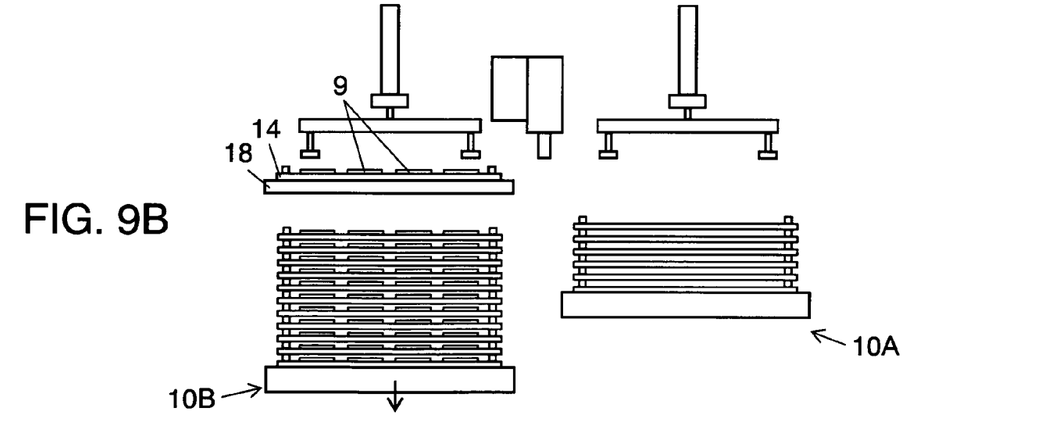
Figure 9C:
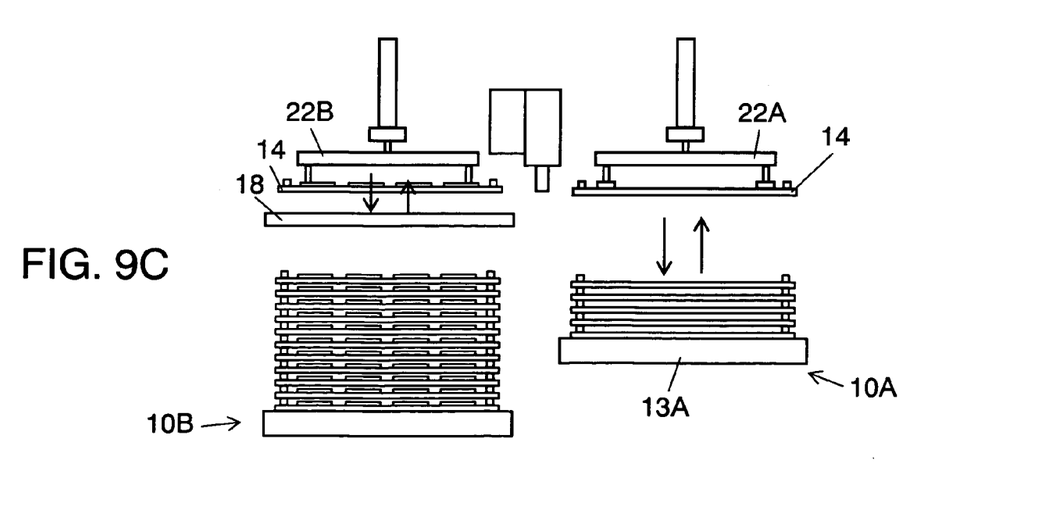

When the palette can be replaced, the palette replacement is executed (ST33). To be more specific, as shown in FIG. 9B, table 18 having a full palette 14 is moved to stacker 10B, then as shown in FIG. 9C, this palette 14 is picked up and raised by head 22B, and retained at the second stand-by position. In parallel with this operation, at stacker 10A, empty palette 14 placed on table 13A is picked up and raised by head 22A, and retained at the first stand-by position.

Figure 10A:
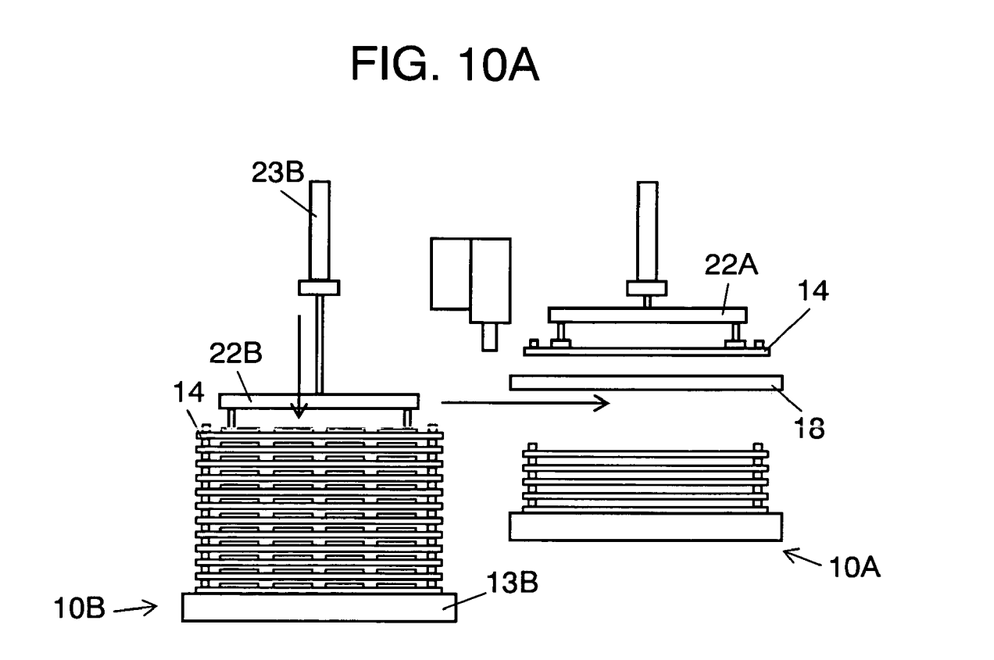
Figure 10B:
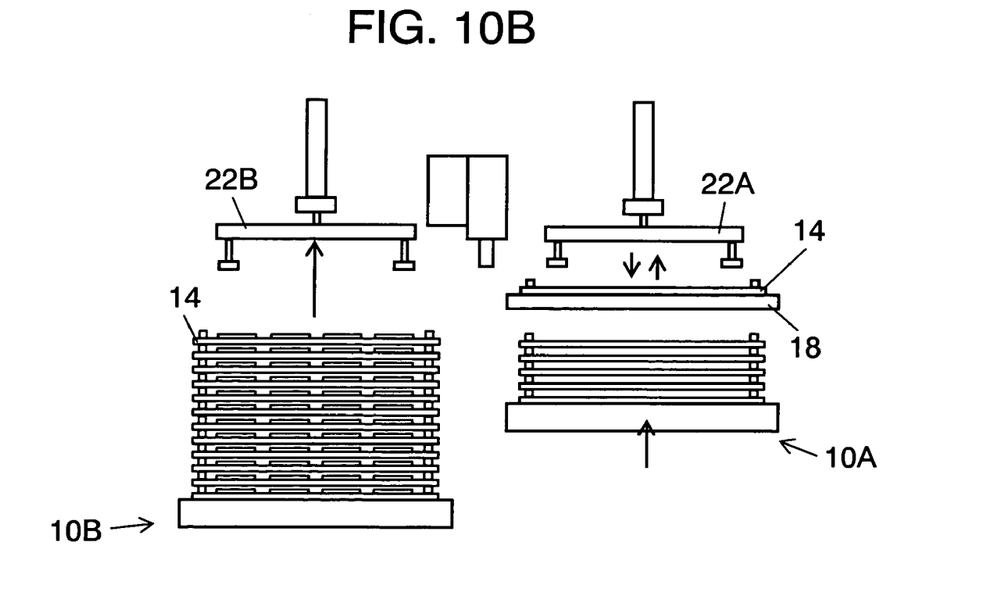

Then as shown in FIG. 10A, empty table 18 is moved to stacker 10A. Next, actuator 23B is driven to lower head 22B, so that palette 14 retained is placed on table 13B. Then as shown in FIG. 10B, head 22A transfers palette 14 onto table 18 moved to stacker 10A, and head 22B is raised. The palette replacement is thus completed.

Program 34 then resets the position-number counter (ST35), and determines whether or not stackers 10A, 10B are filled with palettes 14 or empty (ST36) as done in loader 3. If the stackers are full or empty, necessity of the palette changeover is notified (ST37). If palettes are available but not full in the stackers, the process is returned to ST21 and the steps thereafter are repeated.

Figure 11:
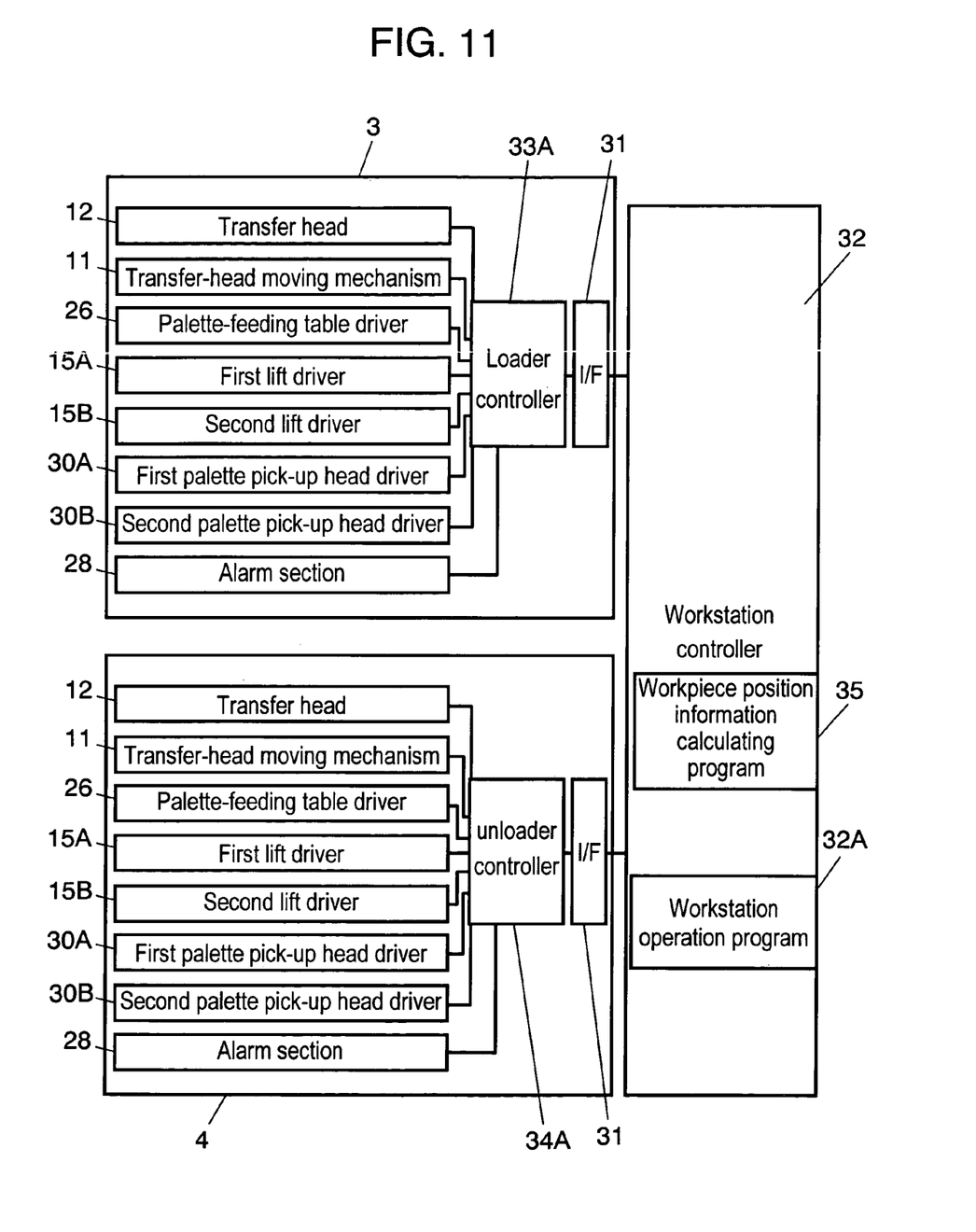
FIG. 11 shows a block diagram illustrating another control system of a loader and an unloader in the display-panel assembly apparatus in accordance with the exemplary embodiment of the present invention.

FIG. 11 shows a block diagram illustrating another control system of a loader and an unloader in the display-panel assembly apparatus in accordance with the exemplary embodiment of the present invention. Loader 3 includes loader 3 shown in FIG. 3 and loader controller 33A, and unloader 4 includes unloader 4 shown in FIG. 3 and unloader controller 34A. Controllers 33A and 34A respectively have control function similar to the one executed by programs 33 and 34 stored in controller 32 shown in FIG. 3.

In the foregoing structure, Controller 33A controls the following elements of loader 3 according to the loader control program: table 18, heads 22A, 22B, head 12, and moving mechanism 11. Controller 34A controls the following elements of unloader 4 according to the unloader control program: table 18, heads 22A, 22B, head 12, and moving mechanism 11. Loader 3, unloader 4 and workstation controller 32 can be thus structured.

As discussed above, in loader 3 in accordance with this embodiment, table 18, on which palette 9 holds substrates 9, is moved between stacker 10A and stacker 10B along direction Y. Then head 12 is moved along direction X by moving mechanism 11, where head 12 is used for picking up substrate 9 held by palette 14 and delivering it to a device downstream. At this time, positioning of head 12 with respect to palette 14 is done by moving table 18 and head 12 cooperatively. In unloader 4, substrate 9 is put onto palette 14 by moving also table 14 and head 12 cooperatively.

The foregoing operation tells that the structure discussed above is simpler and more compact than the conventional one which needs a two-dimensional positioning mechanism in the workpiece transfer mechanism. Besides, head 12 for picking-up substrate 9 from palette 14 and delivering it to the downstream only moves along direction X, i.e. uniaxial movement, so that head 12 can move faster.

As discussed above, in the workpiece loader and the workpiece unloader of the present invention, a first stacker and a second stacker, which hold containers of workpieces in stacked condition, are placed parallel with each other along a first direction. A workpiece-container moving mechanism prepared above the first and second stackers moves a container taken-out in the first direction. A workpiece transfer mechanism picks up a workpiece from the container held by the workpiece-container moving mechanism and delivers the workpiece to a device downstream. This workpiece transfer mechanism moves along a second direction orthogonal to the first direction. The foregoing structure allows the workpiece transfer mechanism to move in one plane, i.e. two-dimensional movement, with respect to the container, so that the two-dimensional moving mechanism can be simplified. As a result, the loader and the unloader have simpler structures and can be downsized, and the moving speed thereof can be faster.

What is claimed is:

1. A loader for picking up workpieces and delivering the workpieces to a workstation downstream of the loader, the loader comprising:

a first stacker configured to hold containers which are stacked, each container holding ones of the workpieces in one plane;

a second stacker configured to hold the containers after the containers have been emptied;

a container moving mechanism moving above the first and the second stackers, the container moving mechanism configured to move the containers between the first stacker and the second stacker along a first direction, said container moving mechanism including a carriage capable of traveling in said first direction along guides;

a first container-transfer mechanism including a first vertical actuator and first suction cups and configured to pick up a respective one of the containers stacked on the first stacker, the container moving mechanism moving under the first vertical actuator such that the respective one of the containers is vertically set down on the container moving mechanism to be moved by the workpiece transfer mechanism; and a second container-transfer mechanism including a second vertical actuator and second suction cups and configured to pick up the respective one of the containers from the container moving mechanism moving under the second container moving mechanism such that the respective one of the containers is vertically set down on the second stacker;

a workpiece transfer mechanism including a fixed rail that is fixed in a position which extends along a second direction orthogonal to the first direction and which is positioned above an intermediate location between the first stacker and the second stacker, the workpiece transfer mechanism configured to pick up respective workpieces from one of the containers, held by the container moving mechanism, then limited by the fixed rail to moving the workpiece in a plane orthogonal to the first direction, and delivering the respective workpieces to the workstation downstream of the workpiece transfer mechanism, the downstream direction corresponding to the second direction; and a controller for calculating a plurality of delivery positions of at least one of the containers for positioning the workpieces held therein for pickup by the workpiece transfer mechanism and for controlling the container moving mechanism to move the at least one of the containers to the plurality of delivery positions according to the calculated delivery positions.

2. The loader of claim 1, wherein the first stacker includes a first lift table on which the one of the containers is placed, and a first lift mechanism for lifting the first lift table, wherein the second stacker includes a second lift table on which the container is placed, and a second lift mechanism for lifting the second lift table.

3. The loader of claim 1, wherein the container moving mechanism moves the one of the containers to a position intermediate the first and second stackers such that the workpiece transfer mechanism picks up the workpiece from the one of the containers positioned at the intermediate position, moves the workpiece along the second direction guided by the fixed rail and then delivers the workpiece to the workstation downstream of the workpiece transfer mechanism.

4. The loader of claim 1, wherein:

the first vertical actuator is disposed above the first stacker and includes a first pick-up head for picking up a topmost container from the containers stacked in the first stacker to a first stand-by position by a lifting operation;

the second vertical actuator is disposed above the second stacker and includes a second pick-up head for picking up the container held by the container moving mechanism to a second stand-by position by a lifting operation; and the container moving mechanism includes a carrying mechanism that moves between a first delivery position and a second delivery position, where the first delivery position is located between the first stacker and the first stand-by position, and the second delivery position is located between the second stacker and the second stand-by position, so that the carrying mechanism carries the container received from the first pick-up head to the second delivery position.

5. The loader of claim 4, wherein the controller controls the carrying mechanism for positioning the workpiece held in the respective one of the containers with respect to the first direction.

6. The loader of claim 1, wherein the controller that controls the container moving mechanism, the first and second vertical actuator, and the workpiece transfer mechanism.

7. The loader of claim 1, wherein the container moving mechanism, the first and second vertical actuators, and the workpiece transfer mechanism are controlled by a workstation controller of the workstation.

8. The loader of claim 1, wherein the workpiece transfer mechanism further includes a head to pickup the workpiece, the head being configured to move in the second direction along the fixed rail such that the workpiece, while picked up by the head, is limited by the fixed rail to movement in a plane orthogonal to the first direction.

9. The loader of claim 1, wherein the controller calculates the plurality of delivery positions based on positions of the workpieces on the at least one of the containers.

10. The loader of claim 1, wherein the first and second vertical actuators operate simultaneously such that when the first vertical actuator is picking up one container from the first stacker, the second vertical actuator is picking up a different container from the container moving mechanism.

11. An unloader for putting workpieces, delivered from a workstation upstream of the unloader, into containers in a plane, the unloader comprising:
 a first stacker configured to hold the containers which are empty in stacked arrangement;
 a second stacker configured to hold the containers in stacked arrangement which have been loaded with the delivered workpieces;
 a container moving mechanism moving above the first and the second stackers, the container moving mechanism configured to move the containers between the first stacker and the second stacker along a first direction, said container moving mechanism including a carriage capable of traveling in said first direction along guides; and
 first vertical including first suction cups and configured to pick up a respective one of the containers stacked on the first stacker, the container moving mechanism moving under the first vertical actuator such that the respective one of the containers is vertically set down on the container moving mechanism;
 a second vertical actuator including second suction cups and configured to pick up the respective one of the containers from the container moving mechanism moving under the second vertical actuator such that the respective one of the containers is vertically set down on the second stacker;
 a workpiece transfer mechanism including a fixed rail that is fixed in a position which extends along a second direction orthogonal to the first direction and which is positioned above an intermediate location between the first stacker and the second stacker, the workpiece transfer mechanism configured to receive the workpieces from the workstation upstream of a workpiece transfer mechanism in the second direction, then limited by the fixed rail to moving the workpieces in a plane orthogonal to the first direction, and putting the workpieces onto each of the containers held by the container moving mechanism, the upstream direction corresponding to the second direction; and
 a controller for calculating a plurality of receiving positions of at least one of the containers for positioning the workpieces to be held therein for delivery by the workpiece transfer mechanism and for controlling the container moving mechanism to move the at least one of the containers to the plurality of receiving positions according to the calculated receiving positions.

12. The unloader of claim 11, wherein the first stacker includes a first lift table on which each of the containers is placed, and a first lift mechanism for lifting the first lift table, wherein the second stacker includes a second lift table on which each of the containers is placed, and a second lift mechanism for lifting the second lift table.

13. The unloader of claim 11, wherein
 the first vertical actuator disposed above the first stacker and including a first pick-up head for picking up a topmost one of the containers stacked in the first stacker to a first stand-by position;
 the second vertical actuator disposed above the second stacker and including a second pick-up head for picking up the one of the containers held by the container moving mechanism to a second stand-by position; and
 the container moving mechanism includes a carrying mechanism that moves between a first delivery position and a second delivery position, where the first delivery position is located between the first stacker and the first stand-by position, and the second delivery position is located between the second stacker and the second stand-by position, so that the carrying mechanism carries the one of the containers received from the first pick-up head to the second delivery position.

14. The unloader of claim 13, wherein the controller controls the container moving mechanism, the first and second vertical actuator, and the workpiece transfer mechanism.

15. The unloader of claim 14, wherein the a controller controls the carrying mechanism for positioning the workpieces held in the one of the containers with respect to the first direction.

16. The unloader of claim 13, wherein the container moving mechanism, the first and second vertical actuator, and the workpiece transfer mechanism are controlled by a workstation controller of the workstation.

17. The unloader of claim 11, wherein the container moving mechanism moves the one of the containers to a position intermediate the first and second stackers such that the workpiece transfer mechanism receives the workpiece from the workstation upstream of the workpiece transfer mechanism, moves the workpiece along the second direction guided by the fixed rail and delivers the workpiece to one of the containers positioned at the intermediate position.

18. A loader for picking up workpieces and delivering the workpieces to a workstation downstream of the loader, the loader comprising:
 a first stacker configured to hold containers which are stacked, each container holding ones of the workpieces in one plane;
 a second stacker configured to hold the containers after the containers have been emptied;
 a container moving mechanism moving above the first and the second stackers, the container moving mechanism configured to move the containers between the first stacker and the second stacker along a first direction, said container moving mechanism including a carriage capable of traveling in said first direction along guides;

first vertical including first suction cups and configured to pick up a respective one of the containers stacked on the first stacker, the container moving mechanism moving under the first vertical actuator such that the respective one of the containers is vertically set down on the container moving mechanism;

a second vertical actuator including second suction cups and configured to pick up the respective one of the containers from the container moving mechanism moving under the second vertical actuator such that the respective one of the containers is vertically set down on the second stacker:

a workpiece transfer mechanism including a fixed rail that extends along a second direction orthogonal to the first direction and is provided between the first stacker and the second stacker, the workpiece transfer mechanism configured to pick up the workpiece from one of the containers, held by the container moving mechanism, then limited by the fixed rail to moving the workpiece in a plane orthogonal to the first direction, and delivering the workpiece to the workstation downstream of the workpiece transfer mechanism, the downstream direction corresponding to the second direction; and a controller for calculating a plurality of delivery positions of at least one of the containers for positioning the workpieces held therein for pickup by the workpiece transfer mechanism and for controlling the container moving mechanism to move the at least one of the containers to the plurality of delivery positions according to the calculated delivery positions.

* * * * *

UNITED STATES PATENT AND TRADEMARK OFFICE
CERTIFICATE OF CORRECTION

PATENT NO. : 7,329,083 B2
APPLICATION NO. : 10/848441
DATED : February 12, 2008
INVENTOR(S) : Nakazato et al.

It is certified that error appears in the above-identified patent and that said Letters Patent is hereby corrected as shown below:

At Column 11, line 5, "wherein the controller that controls" should read --wherein the controller controls--

At Column 11, line 7, "second vertical actuator," should read --second vertical actuators,--

At Column 12, line 34, "second vertical actuator," should read --second vertical actuators,--

At Column 12, line 41, "second vertical actuator," should read --second vertical actuators,--

Signed and Sealed this

Sixteenth Day of December, 2008

JON W. DUDAS
*Director of the United States Patent and Trademark Office*